US010526208B2

United States Patent
Corma Canós et al.

(10) Patent No.: US 10,526,208 B2
(45) Date of Patent: *Jan. 7, 2020

(54) METHOD FOR PREPARING THE SILICOALUMINATE FORM OF THE AEI ZEOLITE STRUCTURE WITH HIGH YIELDS, AND ITS APPLICATION IN CATALYSIS

(71) Applicants: Consejo Superior de Investigaciones Científicas (CSIC), Madrid (ES); Universitat Politècnica de València, Valencia (ES)

(72) Inventors: Avelino Corma Canós, Valencia (ES); Manuel Moliner Marín, Valencia (ES); Nuria Martín García, Valencia (ES)

(73) Assignees: Consejo Superior de Investigaciones Cientificas, Madrid (ES); Universitat Politència de València, Valencia (ES)

( * ) Notice: Subject to any disclaimer, the term of this patent is extended or adjusted under 35 U.S.C. 154(b) by 164 days.

This patent is subject to a terminal disclaimer.

(21) Appl. No.: 15/566,302

(22) PCT Filed: Apr. 14, 2016

(86) PCT No.: PCT/EP2016/058275
§ 371 (c)(1),
(2) Date: Oct. 13, 2017

(87) PCT Pub. No.: WO2016/166245
PCT Pub. Date: Oct. 20, 2016

(65) Prior Publication Data
US 2018/0093895 A1    Apr. 5, 2018

(30) Foreign Application Priority Data
Apr. 16, 2015   (ES) .................................. 201530514

(51) Int. Cl.
*C01B 39/48* (2006.01)
*B01J 29/70* (2006.01)
(Continued)

(52) U.S. Cl.
CPC ............ *C01B 39/48* (2013.01); *B01D 9/0036* (2013.01); *B01J 29/70* (2013.01); *B01J 29/76* (2013.01);
(Continued)

(58) Field of Classification Search
CPC ....... C01B 39/026; C01B 39/48; B01L 29/70; B01L 29/76; B01L 2229/14; B01L 2229/186; B01D 53/9418; B01D 2255/50
See application file for complete search history.

(56) References Cited

U.S. PATENT DOCUMENTS 5,958,370 A    9/1999  Zones et al.
10,035,141 B2 *  7/2018  Sano .................. B01D 53/8628
(Continued)

FOREIGN PATENT DOCUMENTS

WO    WO 2015/005369 A1    1/2015

OTHER PUBLICATIONS

T. Sonoda et al., "Synthesis of High-Silica AEI Zeolites with Enhanced Thermal Stability by Hydrothermal Conversion of FAU Zeolites, and Their Activity in the Selective Catalytic Reduction of $No_x$ with $NH_3$", Journal of Materials Chemistry A, vol. 3, No. 2, Nov. 13, 2014, pp. 857-865.
(Continued)

*Primary Examiner* — David M Brunsman
(74) *Attorney, Agent, or Firm* — Suzhannah K. Sundby, Esq.; Canady + Lortz LLP

(57) ABSTRACT

A synthesis process for a crystalline material with the AEI zeolite structure, comprising (i) preparation of a mixture containing, at least, water, one zeolite with the FAU crystal
(Continued)

structure as the only source of silicon and aluminum, a cyclic ammonium cation with alkyl substituents as the OSDA, and a source of alkaline or alkaline-earth cations (A), wherein the synthesis mixture has the following molar composition: $SiO_2$:a $Al_2O_3$:b OSDA:c A:d $H_2O$ where a ranges between 0.001 and 0.2; where b ranges between 0.01 and 2; where c ranges between 0 and 2; where d ranges between 1 and 200; and wherein the mixture is free from phosphorous and fluorinated species, (ii) crystallisation of the mixture and, (iii) recovery of the crystalline material. Also, preparation of catalysts based on the AEI zeolite and application as a catalysts in processes including the selective catalytic reduction of $NO_x$.

22 Claims, 1 Drawing Sheet

(51) Int. Cl.

| | |
|---|---|
| *B01J 29/76* | (2006.01) |
| *C01B 39/02* | (2006.01) |
| *B01J 35/00* | (2006.01) |
| *B01D 9/00* | (2006.01) |
| *C01B 39/04* | (2006.01) |
| *C01B 39/24* | (2006.01) |
| *B01D 53/94* | (2006.01) |

(52) U.S. Cl.
CPC ........... *B01J 35/002* (2013.01); *C01B 39/023* (2013.01); *C01B 39/026* (2013.01); *C01B 39/04* (2013.01); *C01B 39/24* (2013.01); *B01D 53/9418* (2013.01); *B01D 2255/50* (2013.01); *B01J 2229/183* (2013.01); *B01J 2229/186* (2013.01)

(56) References Cited

U.S. PATENT DOCUMENTS

2016/0144347 A1* 5/2016 Sano .................. B01D 53/8628
2018/0141001 A1* 5/2018 Corma Canos ....... C01B 39/026

OTHER PUBLICATIONS

M. Moliner et al., "Cu-SSZ-39, An Active and Hydrothermally Stable Catalyst for the Selective Catalytic Reduction of $NO_x$", Chemical Communications, vol. 48, No. 66, Jun. 27, 2012, pp. 8264-8266.

M. Moliner et al., "Cu-SSZ-39, An Active and Hydrothermally Stable Catalyst for the Selective Catalytic Reduction of $NO_x$", Electronic Supplementary Information (ESI).

M. Dusselier et al., "Influence of Organic Structure Directing Agent Isomer Distribution on the Synthesis of SSZ-39", Chemistry of Materials, vol. 27, No. 7, pp. 2695-2702, Mar. 30, 2015.

* cited by examiner

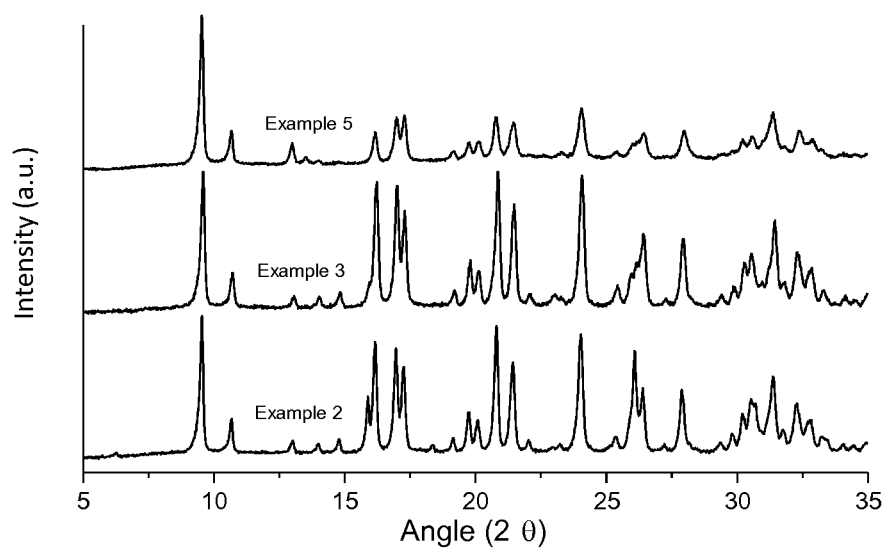

METHOD FOR PREPARING THE SILICOALUMINATE FORM OF THE AEI ZEOLITE STRUCTURE WITH HIGH YIELDS, AND ITS APPLICATION IN CATALYSIS

TECHNICAL FIELD

The present invention discloses a new method for preparing the silicoaluminate form of the AEI zeolite structure based on the use of another zeolite, such as zeolite Y (FAU zeolite structure), as the only source of silicon and aluminum, in order to obtain high synthesis yields (greater than 80%) in the absence of any additional source of silicon, phosphine-derived cations or fluoride anions in the synthesis medium. The present invention also discloses the preparation of the silicoaluminate form of zeolite AEI with Cu species introduced therein, synthesised by means of post-synthetic methodologies, and its application as a catalyst in the selective catalytic reduction (SCR) of NOx, amongst others.

BACKGROUND

Zeolites, or molecular sieves, are described as materials formed by $TO_4$ tetrahedra (T=Si, Al, P, Ge, B, Ti, Sn, etc.) interconnected by oxygen atoms, with pores and cavities of uniform size and shape within the molecular range. These zeolite materials have important applications as catalysts, adsorbents or ion exchangers, amongst others (Martinez et al., Coord. Chem. Rev., 2011, 255, 1558).

The formation of nitrogen oxides (NOx) during the combustion of fossil fuels has become a serious problem in present-day society, since these gases are amongst the main air pollutants. Recently, it has been disclosed that one of the most efficient processes for controlling these gas emissions is the selective catalytic reduction (SCR) of NOx using ammonia as the reducing agent (Brandenberger, et al. Catal. Rev. Sci. Eng., 2008, 50, 492).

In this regard, in recent years it has been disclosed that different silicoaluminate forms of small-pore zeolites with copper atoms introduced therein present high catalytic activity and high hydrothermal stability in the SCR of NOx (Bull, et al. U.S. Pat. No. 7,601,662, 2009; Moliner et al. WO2013159825, 2012). Amongst the different small-pore zeolites, zeolite SSZ-13 (CHA-framework zeolite) with copper atoms introduced therein (Cu-SSZ-13) has been widely used in the literature as a catalyst in the SCR of NOx (Bull, et al. U.S. Pat. No. 7,601,662, 2009). Zeolite SSZ-13 is formed by a tri-directional system of small pores (<4 Å) interconnected by large cavities and, moreover, said crystal structure presents small cages, known as double-6 rings (DA6). In this regard, the great hydrothermal stability of the Cu-SSZ-13 catalyst is due to the co-ordination of the copper atoms in the DA6 present in the large cavities of zeolite SSZ-13 (J. Phys. Chem. C., 2010, 114, 1633).

Another zeolite with structural properties related to those of CHA is SSZ-39 (AEI zeolite structure), which is an silicoaluminate with large cavities connected through a tri-directional system of small pores, and which also presents DA6 in its structure (Wagner, et al. J. Am. Chem. Soc., 2000, 122, 263). Recently, it has been disclosed that the silicoaluminate form of the AEI zeolite structure with copper atoms introduced therein is an active, highly stable catalyst from the hydrothermal standpoint in the SCR of NOx with ammonia (Moliner et al. WO2013159825, 2012), and exhibits an even better catalytic behaviour than the Cu-SSZ-13 catalyst (Moliner et al. Chem. Commun. 2012, 48, 8264).

The first synthesis methodology disclosed for the preparation of the silicoaluminate form of the AEI zeolite structure uses various cyclic quaternary ammoniums with alkyl substituents as organic structure-directing agents (OSDAs) (Zones, et al. U.S. Pat. No. 5,958,370, 1999). In said preparations, the use of silicon oxide and aluminum oxide as sources of silicon and aluminum, respectively, has been claimed for the preparation of the silicoaluminate form of the AEI zeolite structure (Zones, et al. U.S. Pat. No. 5,958,370, 1999). Unfortunately, the silicoaluminate form of materials with the AEI structure obtained by means of said synthesis methodology always present very low synthesis yields (less than 52%), due to the fact that the final crystalline solids have an Si/Al ratio that is much lower than the initial Si/Al ratio introduced into the synthesis gel (see Table 1

TABLE 1

Synthesis conditions and synthesis yields obtained by means of the synthesis process disclosed in the patent "Zones, et al. U.S. Pat. No. 5,958,370, 1999"

| | Si/Al ratio in the reaction mixture | Si/Al ratio in the final solid | Synthesis yield (% weight) |
|---|---|---|---|
| Example 2 | 15 | 7.3 | 48% |
| Example 16 | 50 | 25.5 | 51% |
| Example 18 | 30 | 8.6 | 29% |

These very different Si/Al ratios suggest that most of the silicon species introduced in the synthesis remain in solution following the crystallisation process, and do not become a part of the zeolite produced. Therefore, these low synthesis yields prevent the potential commercial application of the silicoaluminate SSZ-39 (AEI framework), despite the fact that the cyclic quaternary ammoniums with alkyl substituents used as OSDAs may be appealing, from an economic standpoint, for the preparation of zeolite SSZ-39, since they can be easily obtained from commercially available pyridine precursors.

The synthesis of the silicoaluminate form of zeolite AEI has been performed with high synthesis yields (greater than 80%) using cyclic quaternary ammoniums as OSDAs and fluoride anions in the synthesis medium (Cao et al., US20050197519, 2005). Unfortunately, the presence of fluorine in the synthesis medium and/or the crystalline material synthesised is not recommendable for potential industrial applications. This is due to the high corrosivity and hazards presented by hydrofluoric acid or fluorinated derivatives when they are used as a reactive source, or as a subproduct formed in post-synthetic steps (for example, in the calcination step). Consequently, it is necessary to develop new efficient synthesis methodologies for the silicoaluminate form of crystalline AEI material in media that are free from fluoride anions. Moreover, this synthesis methodology based on the use of fluoride anions in the synthesis medium results in AEI materials with Si/Al ratios in the final solids greater than 100 (Cao et al., US20050197519, 2005), which suggests a limited incorporation of aluminum into the crystal lattice of the AEI structure. This low incorporation of aluminum species seriously limits the introduction and stabilisation of cation species, such as, for example, $Cu^{2+}$ (it is worth noting that $Al^{3+}$ species in tetrahedral coordination in the crystal lattice of zeolite generate a negative charge, which would be responsible for compensating and stabilising the cation species). Therefore, this low quantity of aluminum in the lattice would prevent the preparation of efficient Cu-AEI catalysts for application in the SCR of NOx.

Recently, the preparation of the silicoaluminate form of the AEI crystal structure with high synthesis yields (~80%) using tetraethylphosphonium cations as OSDAs has been disclosed (Maruo, et al. Chem. Lett., 2014, 43, 302-304; Sonoda, et al. J. Mater. Chem. A, 2015, 3, 857). Unfortunately, this process requires the use of phosphine-derived OSDAs, which presents significant disadvantages. On the one hand, the use of organic molecules derived from phosphines poses serious, inevitable environmental and health problems. On the other hand, the complete elimination of the phosphorous species retained inside the zeolite cavities is very complicated, especially in small-pore zeolites, and the elimination process requires calcination steps at very high temperatures and hydrogen atmospheres for the complete decomposition/elimination of said species (Sonoda, et al. J. Mater. Chem. A, 2015, 3, 857).

As previously discussed, small-pore zeolites substituted with a metal inside the structure, especially small-pore zeolites with copper atoms introduced therein, present an excellent catalytic activity for the SCR of NOx with ammonia or hydrocarbons as the reducing agents in the presence of oxygen. The conventional preparation of this type of metal-zeolites is performed by means of post-synthetic metal ion-exchange processes (Bull, et al. U.S. Pat. No. 7,601,662, 2009).

According to the present invention, we have found a new process for synthesising the silicoaluminate form of the AEI zeolite structure in the absence of harmful compounds such as those mentioned above and with suitable Si/Al ratios. Moreover, it has been discovered that, thanks to the use of zeolites with a high silica content as the only source of Si and Al in the synthesis of these materials, the silicoaluminates obtained have a high silica content, in addition to yields greater than 80%.

DESCRIPTION OF THE INVENTION

The present invention relates to a new synthesis process for the silicoaluminate form of the AEI zeolite structure based on the use of another zeolite, zeolite Y (FAU zeolite structure) as the only source of silicon and aluminum, in order to obtain high synthesis yields (greater than 80%), in the absence of any other additional source of silicon, phosphine-derived cations and fluoride anions in the synthesis medium. In the present invention, the N,N-dimethyl-3,5-dimethylpiperidinium cation is preferably used as the OSDA, and the FAU crystal structure is transformed into the AEI crystal structure with high yields.

The present invention also relates to the preparation of catalysts based on the silicoaluminate form of the AEI crystal structure, wherein Cu atoms have been introduced by means of post-synthetic treatments, for subsequent application as catalysts, preferably in the SCR of NOx.

Thus, the present invention relates to a synthesis process for a crystalline material with the AEI zeolite structure, which may comprise, at least, the following steps:
(i) Preparation of a mixture containing, at least, water, one zeolite with the FAU crystal structure, such as zeolite Y, as the only source of silicon and aluminum, a cyclic ammonium cation with alkyl substituents as the OSDA, and a source of alkaline or alkaline-earth cations (A), and wherein the synthesis mixture may have the following molar composition:

$SiO_2$:a $Al_2O_3$:b OSDA:c A:d $H_2O$ where a ranges between 0.001 and 0.2, preferably between 0.005 and 0.1, and, more preferably, between 0.01 and 0.07;
where b ranges between 0.01 and 2, preferably between 0.1 and 1, and, more preferably, between 0.1 and 0.6;
where c ranges between 0 and 2; preferably between 0.001 and 1, and, more preferably, between 0.01 and 0.8;
where d ranges between 1 and 200, preferably between 1 and 50, and, more preferably, between 2 and 30.
(ii) Crystallisation of the mixture obtained in (i) in a reactor.
(iii) Recovery of the crystalline material obtained in (ii).

According to the present invention, the crystalline material with the FAU zeolite structure is used in (i) as the only source of silicon and aluminum. Preferably, the zeolite used presents a Si/Al ratio greater than 7.

One of the advantages of the present invention is that the reaction mixture prepared in step (i) is preferably free from phosphorous and fluorinated species (including fluoride anions).

According to a preferred embodiment of the present invention, the source of alkaline or alkaline-earth cations may be any source of these elements, preferably selected from a source of Na, K and combinations thereof.

According to the present invention, the OSDA required in step (i) may be any cyclic ammonium cation, preferably a cyclic quaternary ammonium with any alkyl substituent in its structure. According to a particular embodiment, the OSDA may be preferably selected from N,N-dimethyl-3,5-dimethylpiperidinium (DMDMP), N,N-diethyl-2,6-dimethylpiperidinium (DEDMP), N,N-dimethyl-2,6-dimethylpiperidinium, N-ethyl-N-methyl-2,6-dimethylpiperidinium and combinations thereof; preferably, the OSDA is N,N-dimethyl-3,5-dimethylpiperidinium.

According to a particular embodiment, the process of the present invention may further comprise another OSDA, called co-operative OSDA, which may also be present in step (i), and may be selected from any cyclic quaternary ammonium or any other organic molecule, such as, for example, any amine or quaternary ammonium.

According to a preferred embodiment, the co-operative OSDA is an ammonium cation, preferably, a cyclic ammonium cation.

According to another particular embodiment, the co-operative OSDA is an amine.

According to the present invention, the crystallisation process described in (ii) is preferably performed in autoclaves, under static or dynamic conditions, at a temperature selected from 100° C. and 200° C., preferably from 130° C. and 200° C., and, more preferably, from 130° C. and 175° C.; with a crystallisation time that may range between 6 hours and 50 days, preferably between 1 and 20 days, and, more preferably, between 1 and 10 days. It must be borne in mind that the components of the synthesis mixture may originate from different sources, which may modify the crystallisation conditions described.

According to a particular embodiment of the process of the present invention, it is possible to add AEI crystals to the synthesis mixture, which act as seeds that favour the synthesis described, in a quantity of up to 25% by weight with respect to the total quantity of oxides. These crystals may be added before or during the crystallisation process.

According to the process described, following the crystallisation described in (ii), the resulting solid is separated from the mother liquours and recovered. The recovery step (iii) may be performed by means of any well-known separation technique, such as, for example, decantation, filtration, ultrafiltration, centrifugation or any other solid-liquid separation technique, and combinations thereof.

The process of the present invention may further comprise the elimination of the organic content retained inside the material by means of an extraction process.

According to a particular embodiment, the elimination of the organic compound retained inside the material may be performed by means of a heat treatment at temperatures greater than 25° C., preferably between 100° C. and 1000° C., for a period of time preferably ranging between 2 minutes and 25 hours.

According to another particular embodiment, the material produced according to the present invention may be pelletised using any well-known technique.

In the process described above, any cation present in the material may be exchanged, by means of ion exchange, with other cations using conventional techniques. Thus, depending on the $X_2O_3/YO_2$ molar ratio of the material synthesised, any cation present in the material may be exchanged, at least partially, by means of ion exchange. These exchange cations are preferably selected from metals, protons, proton precursors (such as, for example, ammonium ions) and mixtures thereof, and, more preferably, said cation is a metal selected from rare earth elements, metals of groups IIA, IIIA, IVA, VA, IB, IIB, IIIB, IVB, VB, VIB, VIIB and VIII, and combinations thereof.

According to a preferred embodiment, the ion exchange cation is copper.

The present invention also relates to a zeolite material with the AEI structure obtained according to the process described above, which may have the following molar composition:

SiO$_2$:o Al$_2$O$_3$:p A:q OSDA:s H$_2$O where
A is an alkaline or alkaline-earth cation;
o ranges between 0.001 and 0.2, preferably between 0.005 and 0.1; and, more preferably, between 0.01 and 0.07.
p ranges between 0 and 2, preferably between 0.001 and 1; and, more preferably, between 0.01 and 0.8.
q ranges between 0.01 and 1, preferably between 0.01 and 0.5; and, more preferably, between 0.01 and 0.3.
s ranges between 0 and 2, preferably between 0 and 1.5; and, more preferably, between 0 a 1.

According to a preferred embodiment, the material obtained according to the present invention may be calcined. Thus, the zeolite material with the AEI structure may have the following molar composition after being calcined:

SiO$_2$:o Al$_2$O$_3$:p A where o ranges between 0.001 and 0.2, preferably between 0.005 and 0.1; and, more preferably, between 0.01 a 0.07.

where p ranges between 0 and 2, preferably between 0.001 and 1; and, more preferably, between 0.01 and 0.8.

The material of the present invention obtained according to the process described above has the lattice structure of zeolite AEI.

According to a particular embodiment, the crystalline material obtained is preferably free from the presence of phosphorous and fluorine.

According to a preferred embodiment, the material obtained according to the present invention may be subjected to ion exchange with a metal source preferably selected from rare earth elements, metals of groups IIA, IIIA, IVA, VA, IB, IIB, IIIB, IVB, VB, VIB, VIIB and VIII, and combinations thereof, and subsequently subjected to heat treatment.

Thus, the zeolite material with the AEI structure may have the following molar composition after introducing the metal (M):

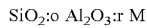
SiO$_2$:o Al$_2$O$_3$:r M where o ranges between 0.001 and 0.2, preferably between 0.005 and 0.1; and, more preferably, between 0.01 and 0.07.

where r ranges between 0.001 and 1, preferably between 0.001 and 0.6; and, more preferably, between 0.001 and 0.5.

Preferably, the metal (M) subjected to ion exchange is copper.

The present invention also relates to the use of the materials described above, obtained according to the process of the present invention, as catalysts in the conversion of feeds formed by organic compounds into higher-added-value products, or as molecular sieves for the elimination/separation of reactive streams (for example, gas mixtures), by placing the feeds in contact with the material obtained.

According to a preferred embodiment, the material obtained according to the present invention may be used in the production of olefins after placing it in contact with an oxygenated organic compound under certain reaction conditions. In particular, when methanol is fed, the olefins obtained are primarily ethylene and propylene. The ethylene and the propylene may be polymerised to form polymers and co-polymers, such as polyethylene and polypropylene.

According to another preferred embodiment, the material obtained in the present invention may be used as a catalyst in the selective catalytic reduction (SCR) of NOx (nitrogen oxides) in a gas stream. In particular, the SCR of NOx is performed in the presence of reducing agents, such as ammonium, urea and/or hydrocarbons. Materials which have had copper atoms introduced according to any well-known technique are especially useful for this purpose.

Throughout the description and the claims, the word "comprises" and variants thereof are not intended to exclude other technical characteristics, additives, components or steps. For persons skilled in the art, other objects, advantages and characteristics of the invention will arise, partly from the description and partly from the practice of the invention.

BRIEF DESCRIPTION OF THE FIGURES

FIG. 1: X-ray diffraction patterns of the materials obtained in the present invention.

EXAMPLES

Below we will describe non-limiting examples of the present invention.

Example 1

Synthesis of
N,N-dimethyl-3,5-dimethylpiperidinium (DMDMP)

10 g of 3,5-dimethylpiperidine (Sigma-Aldrich, ≥96% by weight) is mixed with 19.51 g of potassium bicarbonate (KHCO$_3$, Sigma-Aldrich; 99.7% by weight), and dissolved in 140 ml of methanol. Subsequently, 54 ml of methyl iodide (CH$_3$I, Sigma-Aldrich, ≥99% by weight) is added, and the resulting mixture is kept under stirring for 5 days at room temperature. Once this time has elapsed, the reaction mixture is filtered in order to eliminate the potassium bicarbonate. The filtrated solution is partially concentrated by means of a rotary evaporator. Once the methanol has been partially evaporated, the solution is washed with chloroform several times and magnesium sulfate is added ($MgSO_4$, Sigma-Aldrich, ≥99.5% by weight). Subsequently, the mixture is filtered in order to eliminate the magnesium sulfate. The ammonium salt is obtained by precipitation with diethyl ether and subsequent filtration. The final yield of N,N-dimethyl-3,5-dimethylpiperidinium iodide is 85%.

In order to prepare the hydroxide form of the preceding organic salt: 10.13 g of the organic salt is dissolved in 75.3 g of water. Subsequently, 37.6 g of an anion-exchange resin (Dower SBR) is added, and the resulting mixture is kept under stirring for 24 hours. Finally, the solution is filtered, to obtain N,N-dimethyl-3,5-dimethylpiperidinium hydroxide (with a 94% exchange).

Example 2

Synthesis of the Silicoaluminate Form of the AEI Zeolite Structure Using a Zeolite with the FAU Structure as the Only Source of Silicon and Aluminum 21.62 g of a 6.9% by weight aqueous solution of N,N-dimethyl-3,5-dimethylpiperidinium hydroxide is mixed with 1.89 g of a 20% by weight aqueous solution of sodium hydroxide (NaOH, Sigma-Aldrich, 98%). The mixture is homogenised by being kept under stirring for 10 minutes. Finally, 3.01 g of zeolite with the FAU structure (CBV-720, $SiO_2/Al_2O_3$ molar ratio=21) is added, and the mixture is kept under stirring until the desired concentration is achieved. The composition of the final gel is $SiO_2$/0.047 $Al_2O_3$/0.2 DMDMP/0.2 NaOH/15 $H_2O$. This gel is transferred to a teflon-lined steel autoclave and heated at 135° C. for 7 days under static conditions. Once this time has elapsed, the product obtained is recovered by means of filtration, washing it abundantly with water and, finally, is dried at 100° C. The material is calcined at 550° C. for 4 h in an air atmosphere in order to eliminate the organic matter retained inside. The yield of the solid obtained is greater than 80%.

X-ray diffraction shows that the solid obtained presents the characteristic peaks of the AEI structure (see FIG. 1). The chemical composition of the sample indicates a Si/Al ratio of 8.2.

Example 3

Synthesis of the Silicoaluminate Form of the AEI Zeolite Structure Using a Zeolite with the FAU Structure as the Only Source of Silicon and Aluminum 2.24 g of a 7.4% by weight aqueous solution of N,N-dimethyl-3,5-dimethylpiperidinium hydroxide is mixed with 0.173 g of a 20% by weight aqueous solution of sodium hydroxide (NaOH, Sigma-Aldrich, 98%). The mixture is homogenised by being kept under stirring for 10 minutes. Finally, 0.193 g of zeolite with the FAU structure (CBV-720, $SiO_2/Al_2O_3$ molar ratio=21) is added, and the mixture is kept under stirring until the desired concentration is achieved. The composition of the final gel is $SiO_2$/0.047 $Al_2O_3$/0.4 DMDMP/0.2 NaOH/15 $H_2O$. This gel is transferred to a teflon-lined steel autoclave and heated at 135° C. for 7 days under static conditions. Once this time has elapsed, the product obtained is recovered by means of filtration, washing it abundantly with water and, finally, is dried at 100° C. The material is calcined at 550° C. for 4 h in an air atmosphere in order to eliminate the organic matter retained inside. The yield of the solid obtained is practically 90%.

X-ray diffraction shows that the solid obtained presents the characteristic peaks of the AEI structure (see FIG. 1). The chemical composition of the sample indicates a Si/Al ratio of 9.0.

Example 4

Preparation of the Cu-exchanged Silicoaluminate Form of Zeolite AEI

The sample synthesised and calcined according to the method presented in Example 2 of the present invention is washed with 150 g of a 0.04 M aqueous solution of sodium nitrate ($NaNO_3$, Fluka, 99% by weight) per gram of zeolite. 0.053 g of copper acetate [$(CH_3COO)_2Cu.H_2O$, Probus, 99%] is dissolved in 48 ml of water, and 0.48 g of the previously-washed zeolite is added. The suspension is kept under stirring for 20 h at room temperature. Once this time has elapsed, the product obtained is recovered by means of filtration and washed abundantly with water. Finally, the material is calcined in air at 550° C. for 4 h. The final copper content in the sample is 4.7% by weight.

Example 5

Heat Teatments in the Presence of Water Vapour

The sample prepared according to Example 4 of the present invention is treated with steam in a muffle furnace with 100% $H_2O$ (2.2 ml/min) at 750° C. for 13 hours. The solid obtained is characterised by means of X-ray diffraction, and the characteristic peaks of the AEI zeolite structure are observed (see FIG. 1).

Example 6

Catalytic Assay for the SCR of NOx

The activity for the selective catalytic reduction of NOx is studied using a quartz fixed-bed tubular reactor 1.2 cm in diameter and 20 cm in length. In a typical experiment, the catalyst synthesised according to the present invention is compacted into particles with a size ranging between 0.25-0.42 mm, which are introduced into the reactor, and the temperature is increased to 550° C. (see the reaction conditions in Table 2); subsequently, this temperature is maintained for one hour under a flow of nitrogen. Once the desired temperature has been reached, the reaction mixture is fed. The SCR of NOx is studied using $NH_3$ as the reducing agent. The NOx present at the reactor gas outlet is continuously analysed by means of a chemiluminescence detector (Thermo 62C). The catalytic results are summarised in Table 3.

TABLE 2

| Reaction conditions for the SCR of NOx. | |
| --- | --- |
| Total gas flow (ml/min) | 300 |
| Catalyst loading (mg) | 40 |
| NO concentration (ppm) | 500 |

TABLE 2-continued

Reaction conditions for the SCR of NOx.

| | |
|---|---|
| NH$_3$ concentration (ppm) | 530 |
| O$_2$ concentration (%) | 7 |
| H$_2$O concentration | 5 |
| Temperature interval tested (° C.) | 170-550 |

TABLE 3

Conversion (%) of NOx at different temperatures (200° C., 250° C., 300° C., 350° C., 400° C., 450° C., 500° C.) using the Cu-AEI catalysts prepared according to Examples 4 and 5 of the present invention
Conversion (%) of NOx at different temperatures

| | 200° C. | 250° C. | 300° C. | 350° C. | 400° C. | 450° C. | 500° C. |
|---|---|---|---|---|---|---|---|
| Example 4 | 73.6 | 94.3 | 99.6 | 99.7 | 98.6 | 97.5 | 89.1 |
| Example 5 | 55.3 | 89.0 | 97.1 | 97.9 | 95.0 | 89.2 | 78.0 |

Example 7

Synthesis Using a Zeolite with the FAU Structure and Sodium Silicate as Sources of Aluminum and Silicon, Respectively 1.982 g of a 6.4% by weight aqueous solution of N,N-dimethyl-3,5-dimethylpiperidinium hydroxide is mixed with 0.167 g of a 20% by weight aqueous solution of sodium hydroxide (NaOH, Sigma-Aldrich, 98%). The mixture is homogenised by being kept under stirring for 10 minutes. Subsequently, 0.084 g of zeolite with the FAU structure (CBV-500, SiO$_2$/Al$_2$O$_3$ molar ratio=5.2) and 0.69 g of sodium silicate (NaSiO$_3$, Sigma Aldrich, Na$_2$O 10.6% by weight and SiO$_2$ 26.5% by weight) are added, and the mixture is kept under stirring until the desired concentration is reached. The composition of the final gel is SiO$_2$/0.047 Al$_2$O$_3$/0.2 DMDMP/0.2 NaOH/15 H$_2$O. This gel is transferred to a teflon-lined steel autoclave and heated at 135° C. for 7 days under static conditions. Once this time has elapsed, the product obtained is recovered by means of filtration, washing it abundantly with water, and, finally, is dried at 100° C.

X-ray diffraction shows that the solid obtained presents the characteristic peaks of the AEI structure. The yield of the solid obtained is less than 40%.

Example 8

Synthesis Using a Zeolite with the FAU Structure and LUDOX as Sources of Aluminum and Silicon, Respectively 2.001 g of a 6.4% by weight aqueous solution of N,N-dimethyl-3,5-dimethylpiperidinium hydroxide is mixed with 0.164 g of a 20% by weight aqueous solution of sodium hydroxide (NaOH, Sigma-Aldrich, 98%). The mixture is homogenised by being kept under stirring for 10 minutes. Subsequently, 0.080 g of zeolite with the FAU structure (CBV-500, SiO$_2$/Al$_2$O$_3$ molar ratio=5.2) and 0.454 g of Ludox (SiO$_2$, Sigma Aldrich, 40% by weight) are added, and the mixture is kept under stirring until the desired concentration is achieved. The composition of the final gel is SiO$_2$/0.047 Al$_2$O$_3$/0.2 DMDMP/0.2 NaOH/15 H$_2$O. This gel is transferred to a teflon-lined steel autoclave and heated at 135° C. for 7 days under static conditions. Once this time has elapsed, the product obtained is recovered by means of filtration, washing it abundantly with water, and, finally, is dried at 100° C.

X-ray diffraction shows that the solid obtained is amorphous.

Example 9

Synthesis Using Zeolite with the FAU Structure and Aerosil as Sources of Aluminum and Silicon, Respectively 1.996 g of a 6.4% by weight aqueous solution of N,N-dimethyl-3,5-dimethylpiperidinium hydroxide is mixed with 0.158 g of a 20% by weight aqueous solution of sodium hydroxide (NaOH, Sigma-Aldrich, 98%). The mixture is homogenised by being kept under stirring for 10 minutes. Subsequently, 0.078 g of zeolite with the FAU structure (CBV-500, SiO$_2$/Al$_2$O$_3$ molar ratio=5.2) and 0.181 g of Aerosil are added, and the mixture is kept under stirring until the desired concentration is achieved. The composition of the final gel is SiO$_2$/0.047 Al$_2$O$_3$/0.2 DMDMP/0.2 NaOH/15 H$_2$O. This gel is transferred to a teflon-lined steel autoclave and heated at 135° C. for 7 days under static conditions. Once this time has elapsed, the product obtained is recovered by means of filtration, washing it abundantly with water, and, finally, is dried at 100° C.

X-ray diffraction shows that the solid obtained is amorphous.

The invention claimed is:

1. Synthesis process for a crystalline material with the AEI zeolite structure, comprising, at least, the following steps:
   (i) preparation of a mixture containing, at least, water, one zeolite with the FAU crystal structure as the only source of silicon and aluminum, a cyclic ammonium cation with alkyl substituents as the OSDA, and a source of alkaline or alkaline-earth cations (A), wherein the synthesis mixture has the following molar composition:

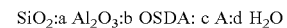
   $SiO_2$:a $Al_2O_3$:b OSDA: c A:d $H_2O$ where a ranges between 0.001 and 0.2;
   where b ranges between 0.01 and 2;
   where c ranges between 0 and 2;
   where d ranges between 1 and 200; and
   wherein the mixture is free from phosphorous and fluorinated species;
   (ii) crystallisation of the mixture obtained in (i) in a reactor; and
   (iii) recovery of the crystalline material obtained in (ii).

2. Process according to claim 1, wherein the cyclic ammonium cation used as the OSDA is a quaternary ammonium selected from N,N-dimethyl-3,5-dimethylpiperidinium (DMDMP), N,N-diethyl-2,6-dimethylpiperidinium (DEDMP), N,N-dimethyl-2,6-dimethylpiperidinium, N-ethyl-N-methyl-2,6-dimethylpiperidinium, and combinations thereof.

3. Process according to claim 2, wherein the OSDA is N,N-dimethyl-3,5-dimethylpiperidinium.

4. Process according to claim 1, further comprising another co-operative OSDA present in step (i), which is any organic molecule.

5. Process according to claim 4, wherein the co-operative OSDA is an ammonium cation.

6. Process according to claim 5, wherein the co-operative OSDA is a cyclic ammonium cation.

7. Process according to claim 4, wherein the co-operative OSDA is an amine.

8. Process according to claim 1, wherein the crystallisation process described in (ii) is performed in autoclaves, under static or dynamic conditions.

9. Process according to claim 1, wherein the crystallisation process described in (ii) is performed at a temperature ranging between 100° C. and 200° C.

10. Process according to claim 1, wherein the crystallisation time of the process described in (ii) ranges between 6 hours and 50 days.

11. Process according to claim 1, further comprising the addition of AEI crystals, designed to act as seeds, to the synthesis mixture in a quantity of up to 25% by weight with respect to the total quantity of oxides.

12. Process according to claim 11, wherein the AEI crystals are added before the crystallisation process or during the crystallisation process.

13. Process according to claim 1, wherein the recovery step (iii) is performed using a separation technique selected from decantation, filtration, ultrafiltration, centrifugation and combinations thereof.

14. Process according to claim 1, further comprising the elimination of the organic content retained inside the material by means of an extraction process.

15. Process according to claim 1, further comprising the elimination of the organic content retained inside the material by means of a heat treatment at temperatures ranging between 100° C. and 1000° C. for a period of time ranging between 2 minutes and 25 hours.

16. Process according to claim 1, wherein the material obtained is pelletised.

17. Process according to claim 1, wherein any cation present in the material may be exchanged with other cations by means of ion exchange using conventional techniques.

18. Process according to claim 17, wherein the exchange cation is selected from metals, protons, proton precursors and mixtures thereof.

19. Process according to claim 18, wherein the exchange cation is a metal selected from rare earth elements, metals of groups IIA, IIIA, IVA, VA, IB, IIB, IIIB, IVB, VB, VIB, VIIB and VIII, and combinations thereof.

20. Process according to claim 19, wherein the metal is copper.

21. Synthesis process for a crystalline material with the AEI zeolite structure, comprising, at least, the following steps:
(i) preparation of a mixture containing, at least: water; one zeolite with the FAU crystal structure as the only source of silicon and aluminum; an OSDA selected from the group consisting of N,N-dimethyl-3,5-dimethylpiperidinium (DMDMP), N,N-diethyl-2,6-dimethylpiperidinium (DEDMP), N,N-dimethyl-2,6-dimethylpiperidinium, N-ethyl-N-methyl-2,6-dimethylpiperidinium, and combinations thereof; and a source of alkaline or alkaline-earth cations (A), wherein the synthesis mixture has the following molar composition:

$SiO_2$:a $Al_2O_3$:b OSDA:c A:d $H_2O$ where a ranges between 0.001 and 0.2;
where b ranges between 0.01 and 2;
where c ranges between 0 and 2;
where d ranges between 1 and 200; and
wherein the mixture is free from phosphorous and fluorinated species;
(ii) crystallisation of the mixture obtained in (i) in a reactor; and
(iii) recovery of the crystalline material obtained in (ii).

22. The synthesis process according to claim 21, wherein the zeolite with the FAU crystal structure has a $SiO_2$:$Al_2O_3$ molar ratio of 21.

* * * * *